United States Patent
Chuang et al.

(10) Patent No.: US 7,573,703 B2
(45) Date of Patent: Aug. 11, 2009

(54) PORTABLE ELECTRONIC DEVICE

(75) Inventors: I-Chen Chuang, Taoyuan (TW); San-Chi Ho, Taoyuan (TW); Ko-Min Wang, Taoyuan (TW)

(73) Assignee: HTC Corporation, Taoyuan County (TW)

( * ) Notice: Subject to any disclaimer, the term of this patent is extended or adjusted under 35 U.S.C. 154(b) by 153 days.

(21) Appl. No.: 11/642,915

(22) Filed: Dec. 21, 2006

(65) Prior Publication Data

US 2007/0217135 A1   Sep. 20, 2007

(30) Foreign Application Priority Data

Mar. 17, 2006   (TW) .............................. 95109303 A

(51) Int. Cl.
G06F 1/16 (2006.01)
H05K 5/00 (2006.01)
H05K 7/00 (2006.01)

(52) U.S. Cl. ............................. 361/679.27; 361/679.21; 361/679.26; 455/575.3; 455/575.4

(58) Field of Classification Search ................. 361/681, 361/679.21, 679.26, 679.27; 455/575.3, 455/575.4
See application file for complete search history.

(56) References Cited

U.S. PATENT DOCUMENTS

| | | | |
|---|---|---|---|
| 6,341,061 B1 * | 1/2002 | Eisbach et al. .............. | 361/687 |
| 6,903,927 B2 * | 6/2005 | Anlauff .................. | 361/679.28 |
| 7,068,497 B2 * | 6/2006 | Chu ........................... | 361/681 |
| 7,091,961 B2 * | 8/2006 | Ditzik ........................ | 361/681 |
| 7,133,280 B2 * | 11/2006 | Love .......................... | 361/681 |
| 7,417,865 B2 * | 8/2008 | Kim ...................... | 361/679.01 |
| 7,467,000 B2 * | 12/2008 | Shiba ....................... | 455/575.3 |
| 7,480,524 B2 * | 1/2009 | Moon et al. .............. | 455/575.4 |
| 2004/0233620 A1 * | 11/2004 | Doczy et al. ................ | 361/680 |
| 2005/0052833 A1 * | 3/2005 | Tanaka et al. ............... | 361/681 |
| 2009/0054114 A1 * | 2/2009 | Ozawa .................... | 455/575.4 |

FOREIGN PATENT DOCUMENTS

| EP | 1594291 A1 * | 11/2005 |
|---|---|---|
| EP | 1777923 A1 * | 4/2007 |

* cited by examiner

Primary Examiner—Jayprakash N Gandhi
Assistant Examiner—Adrian S Wilson
(74) Attorney, Agent, or Firm—Birch, Stewart, Kolasch & Birch, LLP

(57) ABSTRACT

A portable electronic device comprises a base, a cover and a linkage mechanism. The linkage mechanism comprises a first linkage assembly and a second linkage assembly. The first linkage assembly pivots to the cover. The second linkage assembly pivots to the first linkage assembly and the base, respectively. The second linkage assembly is movably installed on the base.

12 Claims, 5 Drawing Sheets

PORTABLE ELECTRONIC DEVICE

BACKGROUND OF THE INVENTION

1. Field of the Invention

The invention relates to a portable electronic device, and in particular to a portable electronic device having a cover.

2. Description of the Related Art

Recently, common portable electronic devices are personal digital assistants (PDAs) and cell phones. Referring to FIG. 1, a conventional portable electronic device 10 comprises a base 11, a cover 12 and a connecting mechanism 13. The cover 12 is pivoted to the base 11 via the connecting element 13. The cover 12 is opened to reveal a display 121 before using the portable electronic device 10. When a user opens the cover 12, the volume of the portable electronic device 10 increases. Thus, controlling the portable electronic device 10 when in a user's palm is not convenient.

BRIEF SUMMARY OF INVENTION

A detailed description is given in the following embodiments with reference to the accompanying drawings. The invention provides a portable electronic device. The portable electronic device comprises a base, a cover and a linkage mechanism. The linkage mechanism comprises a first linkage assembly and a second linkage assembly. The first linkage assembly is pivoted to the cover. The second linkage assembly is pivoted to the first linkage assembly and the base, and is movably installed on the base.

The invention provides a portable electronic device. The portable electronic device comprises a base, a cover and a linkage mechanism. The linkage mechanism comprises a first linkage assembly and a second linkage assembly. The first linkage assembly is pivoted to the display. The second linkage assembly is pivoted to the first linkage assembly and the base, and is movably installed on the base.

BRIEF DESCRIPTION OF DRAWINGS

The invention can be more fully understood by reading the subsequent detailed description and examples with references made to the accompanying drawings, wherein.

DETAILED DESCRIPTION OF INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
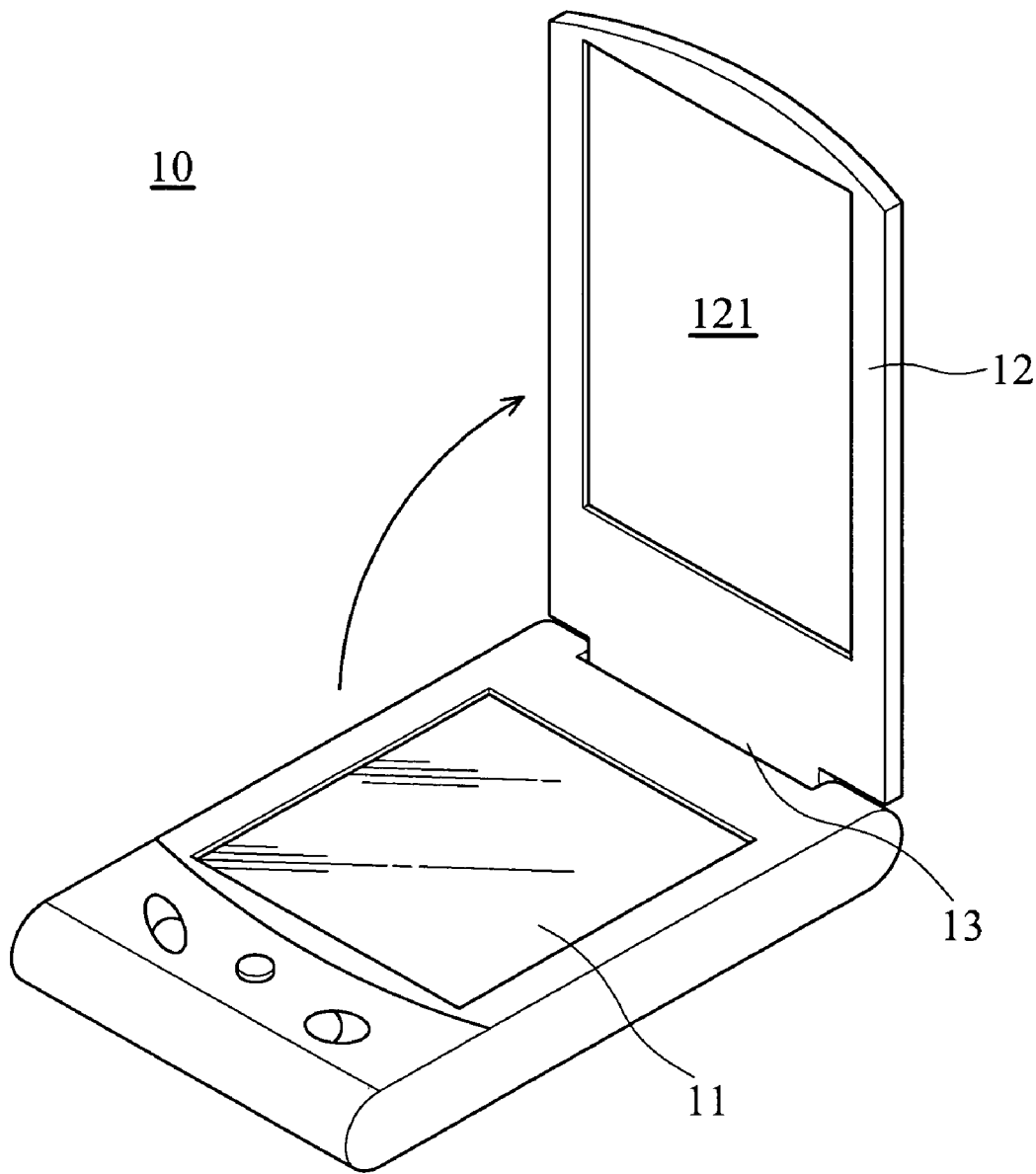
FIG. 1 is a schematic view of a conventional portable electronic device.
Figure 2A:
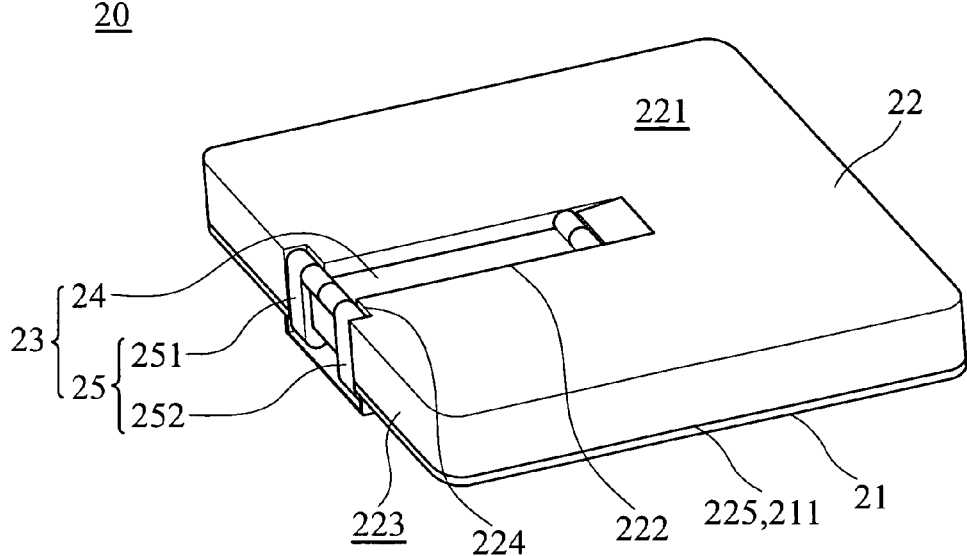
FIGS. 2A to 2F show that a portable electronic device of the invention moves to an open position from a closed position.
Figure 2B:
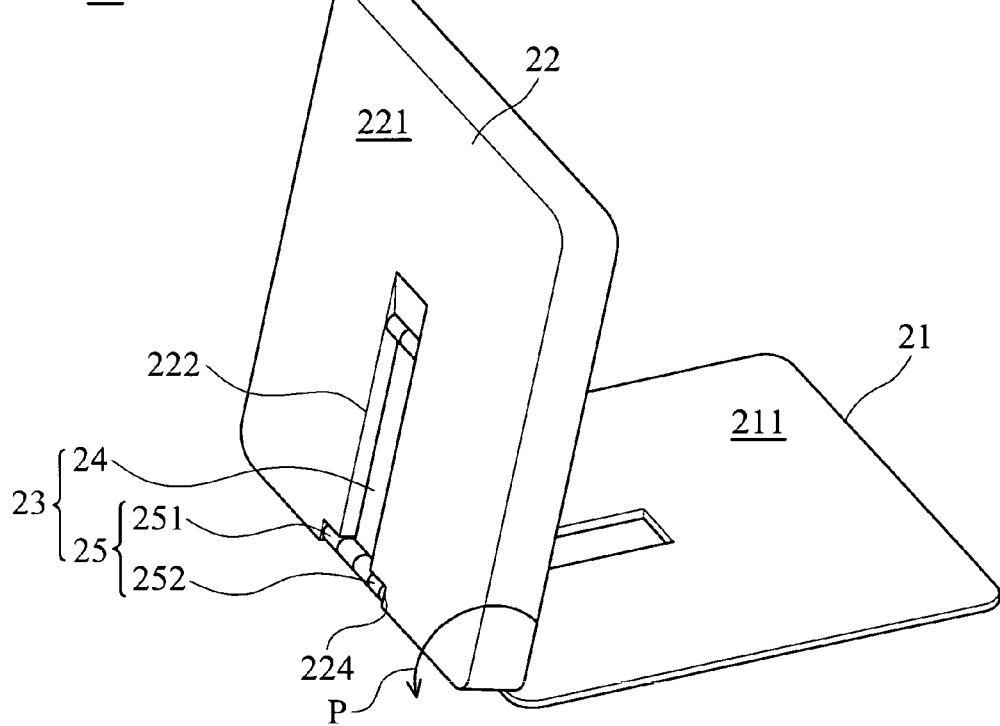
Figure 2C:
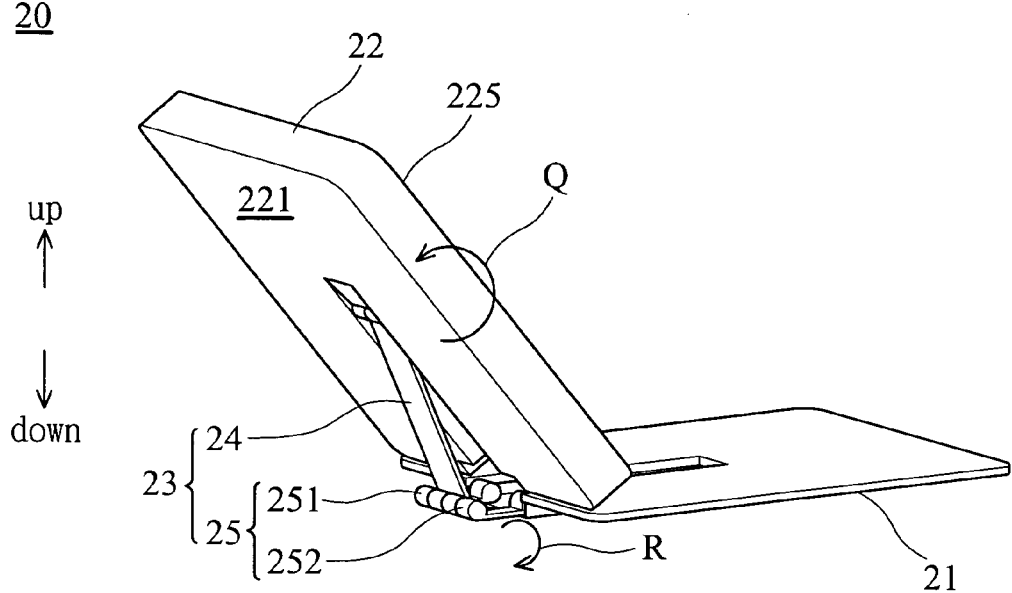
Figure 2D:
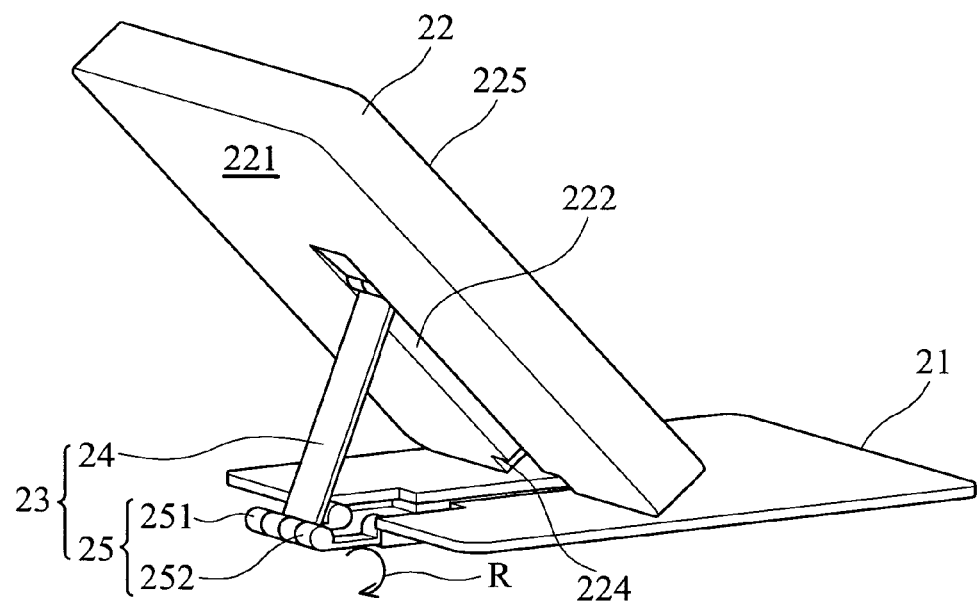
Figure 2E:
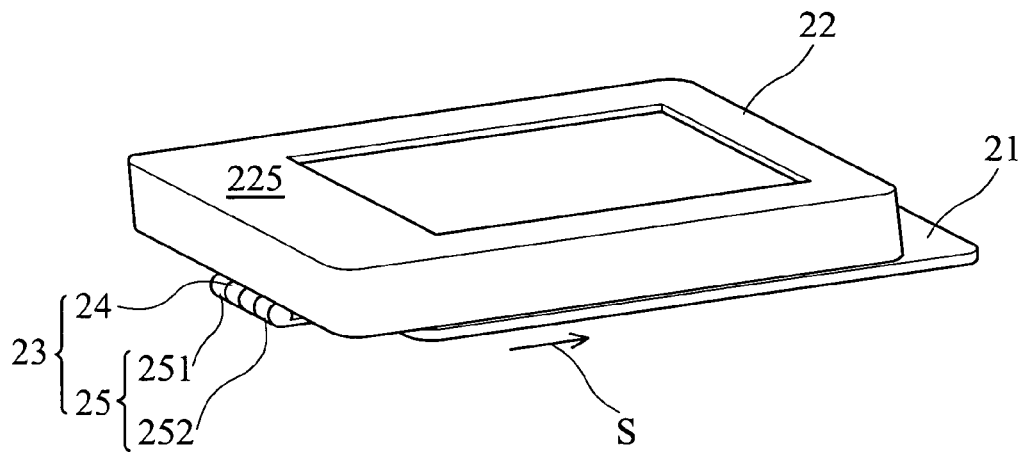
Figure 2F:
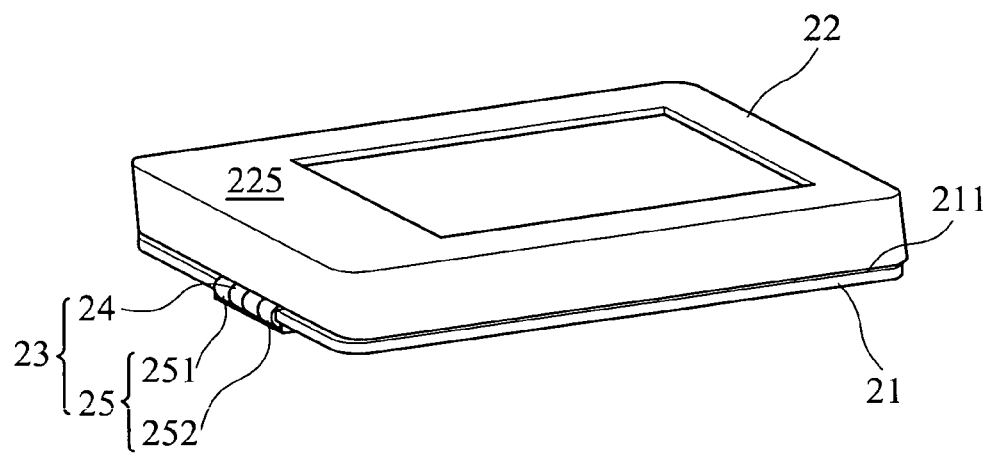

Referring to FIGS. 2A and 2F, the portable electronic device 20 of the invention comprises a base 21, a cover 22 and a linkage mechanism 23. The base 21 comprises a third surface 211. The linkage mechanism 23 comprises a first linkage assembly 24 and a linkage assembly 25. The first linkage assembly 24 is pivoted to the cover 22. The cover 22 comprises a first surface 221, a second surface 223 and a display surface 225. The first surface 221 is located on the back surface of the cover 22. The first surface 221 and the second surface 223 respectively comprises a first space 222 to accommodate the first linkage assembly 24 and a second space 224 to accommodate the second linkage assembly 25. One end of the second linkage assembly 25 is pivoted to the first linkage assembly 24 and the other end of the second linkage assembly 25 is pivoted to the base 21. The second linkage assembly 25 comprises two linkages 251 and 252 to respectively connect to two sides of the first linkage assembly 24.

FIGS. 2A to 2F show the portable electronic device 20 when opened. Referring to FIG. 2A, the cover 22 is closed. When the cover 22 is closed, the first linkage assembly 24 is located in the first space 222, the display surface 225 faces the third surface 211, and the second linkage assembly 25 is approximately perpendicular on the base 21.

Figure 3:
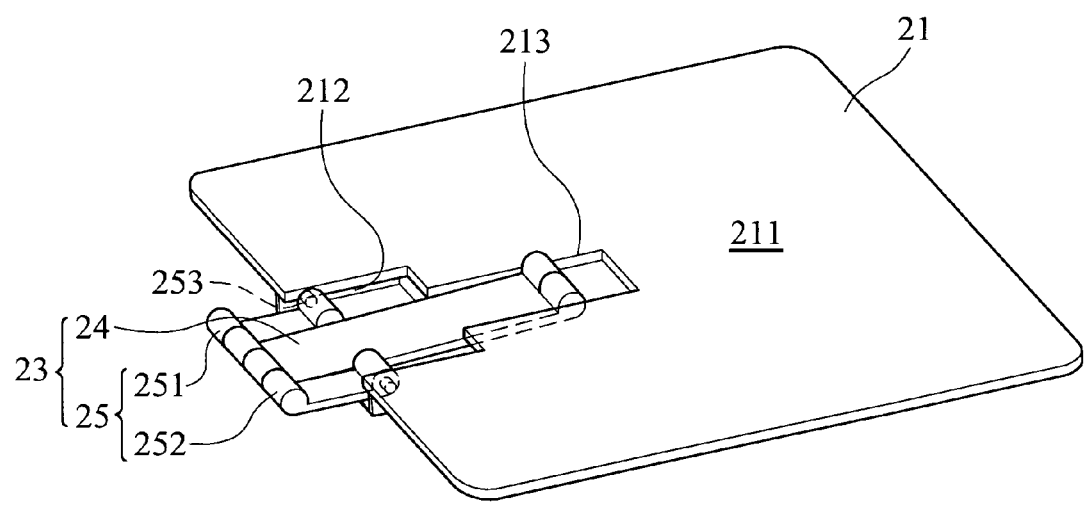
FIG. 3 is a schematic view of a base and a linkage mechanism of a portable electronic device of the invention.

Referring to FIG. 2B, the cover 22 rotates along an arrow P to drive the second linkage assembly 25 to rotate in the same direction. Referring to FIGS. 2C and 2D, the first linkage assembly 24 is pivoted to the first space 222. The cover 22 rotates along an arrow Q to make the display surface 225 upward. Then, the first linkage assembly 24 rotates along an arrow Q to make the cover 22 move until covering the base 21 (shown by FIG. 2E). Referring to FIGS. 2E and 3, the base 21 comprises two grooves 212 and 213. One end of the linkage 251 connected to the base 21 comprises a protrusion 253. The protrusion 253 is installed in the groove 212. Moreover, one end of the linkage 252 connected to the base 21 comprises a protrusion (not shown). When the cover 22 stays near the base 21, the first linkage assembly 24 located in the groove 213 slides therein. Then, the cover 22 is forced along an arrow S until the cover 22 covers the base 21 completely. FIG. 2F shows the cover 22 in an open position. When the cover 22 is in the open position, the display surface 225 faces the third surface 211, and the second linkage assembly 25 and the base 21 are on the same surface (shown by FIG. 3). When a user opens the portable electronic device 20 of the invention, the cover 22 overlaps the base 21. Thus, control of the portable electronic device 10 in a user's palm is more convenient.

Note that the cover may be a display. The structure of this embodiment is approximately similar, thus further description is omitted.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A portable electronic device, comprising:

a base;

a cover comprising a first surface and a display surface opposite to the first surface; and a linkage mechanism, comprising a first linkage assembly and a second linkage assembly;

wherein the first linkage assembly is pivoted to the cover;

the second linkage assembly is pivoted to the first linkage assembly and the base;

the second linkage assembly is movably installed on the base;

wherein the cover is capable of being pivoted so that the display surface faces the base and is also capable of being pivoted so that the first surface faces to the base, and when the cover is pivoted so that the first surface covers the base, the cover, the first linkage assembly, and the second linkage assembly are capable of being pushed together until the cover completely covers the base;

wherein the first surface comprises a first space to accommodate the first linkage assembly; wherein the cover comprises a second surface located on one side of the cover, the second surface comprising a second space to accommodate the second linkage assembly; and wherein the second space has different dimensions than the first space.

2. The portable electronic device as claimed in claim 1, wherein the second linkage assembly comprises two linkages to connect to two sides of the first linkage assembly and the base, respectively.

3. The portable electronic device as claimed in claim 1, wherein the base comprises two grooves, the first linkage assembly and the second linkage assembly slide in the grooves.

4. The portable electronic device as claimed in claim 1, wherein the base comprises a third surface, and the cover comprises an open position and a closed position.

5. The portable electronic device as claimed in claim 4, wherein when the cover is in the closed position, the display surface faces the third surface and the second linkage assembly is approximately perpendicular on the base.

6. The portable electronic device as claimed in claim 4, wherein when the cover is at the open position, the display surface is approximately parallel to the third surface and the second linkage assembly and the base are on the same surface.

7. A portable electronic device, comprising:

a base;

a display comprising a first surface and a display surface opposite to the first surface; and a linkage mechanism, comprising a first linkage assembly and a second linkage assembly;

wherein the first linkage assembly is pivoted to the display;

the second linkage assembly is pivoted to the first linkage assembly and the base;

the second linkage assembly is movably installed on the base;

wherein the display is capable of being pivoted so that the display surface faces the base, and is also capable of being pivoted so that the first surface faces to the base, and when the display is pivoted so that the first surface covers the base, the first linkage assembly and the second linkage assembly are capable of being pushed together until the display completely covers the base;

wherein the first surface comprises a first space to accommodate the first linkage assembly; wherein the cover comprises a second surface located on one side of the cover, the second surface comprising a second space to accommodate the second linkage assembly; and wherein the second space has different dimensions than the first space.

8. The portable electronic device as claimed in claim 7, wherein the second linkage assembly comprises two linkages to connect to two sides of the first linkage assembly and the base, respectively.

9. The portable electronic device as claimed in claim 7, wherein the base comprises two grooves, the first linkage assembly and the second linkage assembly slide in the grooves.

10. The portable electronic device as claimed in claim 7, wherein the base comprises a third surface, and the display comprises an open position and a closed position.

11. The portable electronic device as claimed in claim 10, wherein when the display is at the closed position, the display surface faces the third surface and the second linkage assembly is approximately perpendicular on the base.

12. The portable electronic device as claimed in claim 10, wherein when the display is at the open position, the display surface is approximately parallel to the third surface and the second linkage assembly and the base are on the same surface.

* * * * *